March 16, 1948. R. O. HALLEN 2,437,814
SEALING MEANS
Filed May 25, 1944
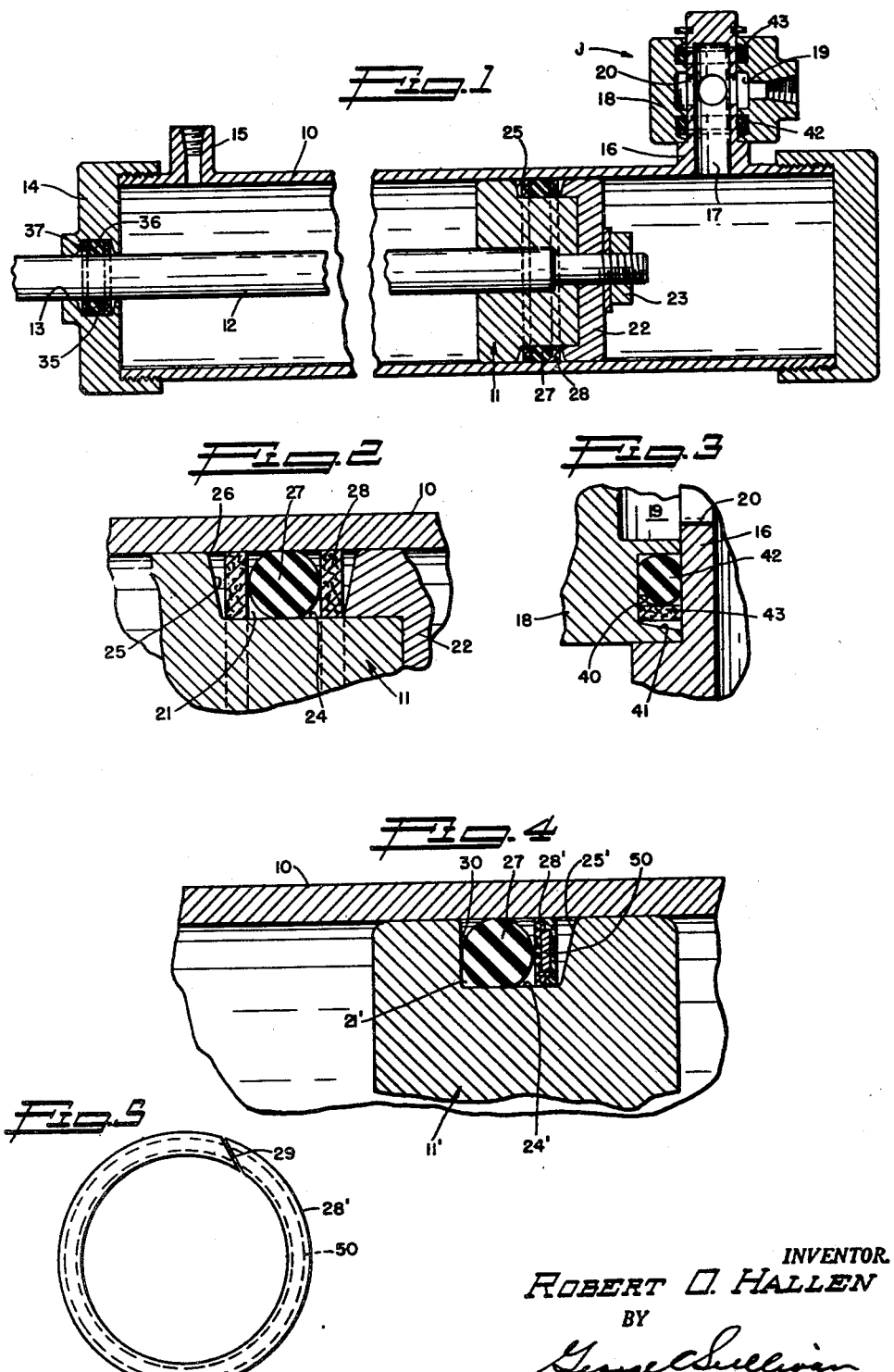
INVENTOR.
ROBERT O. HALLEN
BY
George C. Sullivan
AGENT Patented Mar. 16, 1948

2,437,814

UNITED STATES PATENT OFFICE 2,437,814

SEALING MEANS

Robert O. Hallen, Los Angeles, Calif., assignor to Lockheed Aircraft Corporation, Burbank, Calif.

Application May 25, 1944, Serial No. 537,281

7 Claims. (Cl. 286—26)

This invention has to do with packing or sealing means, and has particular reference to sealing means for association with relatively movable members to prevent the leakage of fluid under pressure.

Where fluid is handled under high pressures it is usually necessary to prevent leakage between the relatively movable members of the apparatus or device. Many forms of packing arrangements have been employed in such situations and in recent years the so-called O-ring packing has gone into extensive use. The O-ring packing usually consists of a ring of cylindrical cross section formed of rubber or rubber-like synthetic material arranged in an annular groove in one of the relatively movable members to contact and seal with the companion member. The O-ring is acted upon by the fluid pressure and is distorted thereby to effectively seal against the walls of its groove and the surface of the companion member. This type of sealing means is compact, very effective and simple to fabricate and install. For these reasons the O-ring packing has been employed extensively in many classes of devices and assemblies. However, where the fluid is handled under substantial or high pressures, a serious difficulty has been encountered in O-ring packing installations. The high fluid pressure imposed on the packing ring forces or extrudes the material of the ring from its groove, and a ridge or lip of the material is extruded between the opposing surfaces of the relatively movable members. The thin extrusion of the relatively soft sealing material is subjected to considerable wear and is soon torn or worn away. This action continues until the O-ring allows the leakage of fluid pressure, whereupon a replacement is necessary. Attempts have been made to correct the condition just described by installing metal rings of various configurations designed to prevent, or reduce to a minimum, the extrusion of the O-ring packing material. These nonextrusion rings are installed in the groove which contains the sealing ring and are split so as to be expansible under pressure to prevent the extrusion of the sealing ring material. The fluid pressure forces the O-ring against the split metal rings, and as the latter "work" or expand and contract, the material of the O sealing ring is cut or chewed at the splits of the metal rings. This action at the splits of the metal backing rings soon destroys substantial portions of the O-ring rendering the latter ineffective. Thus, although the split metal backing rings may be effective in reducing the extrusion of the sealing material they cut away the O-ring at the splits and materially limit the effective life of the sealing ring.

It is an important object of the present invention to provide sealing or packing means embodying an O-ring, for sealing between two relatively movable members, and characterized by simple, yet very effective means for preventing extrusion of the material of the O-ring or sealing ring. The construction of the present invention is such that the sealing ring is not extruded to any appreciable extent, in installations where the fluid is under 3,000 pounds per square inch, or even higher pressures.

Another important object of the invention is to provide a sealing means of the class above referred to in which the sealing ring or O-ring is not cut or otherwise injured by the backing rings for preventing extrusion of the sealing material. The present invention embodies backing rings for the sealing ring which are effective in preventing, or reducing to a minimum, the extrusion of the sealing material and yet are incapable of cutting, abrading or otherwise injuring the sealing ring. I have discovered that by constructing the backing rings of a pliant material such as leather, the extrusion of the O-ring sealing material is effectively eliminated even at very high fluid pressures, and the pliant or somewhat yielding backing rings do not cut the sealing ring even though it may in some instances be desirable to split the backing rings. The pliant or yielding material of the backing rings expands sufficiently in a radial direction, under the influence of the fluid pressure exerted through the medium of the sealing ring, to prevent extrusion of the sealing ring material into the crack or clearance between the relatively movable members and the physical characteristics of the backing rings are such that they do not cut, chew or wear the sealing ring.

Another object of the invention is to provide a sealing means of the character referred to that is effective in providing or maintaining a dependable fluid seal at extremely low temperatures as well as at elevated temperatures under high fluid pressure conditions.

Another object of the invention is to provide a sealing means useful in high fluid pressure installations that offers a minimum of resistance to relative movement between the members with which it is associated. The sealing means of the invention does not embody metal rings or other elements producing friction or offering substantial resistance to relative movement of the members.

A further object of the invention is to provide a sealing means of the character mentioned that is very long wearing even under severe and adverse conditions of the operation. The sealing ring of the assembly is subjected to but little wear and is not extruded excessively or cut by the backing rings, and the backing rings of the installation may be constructed of a strong, long-wearing material.

Other objects and features of the invention will be readily understood from the following detailed description of typical preferred forms of the invention wherein reference will be made to the accompanying drawings in which:

Figure 1 is a longitudinal detailed sectional view of a cylinder and piston mechanism embodying several sealing assemblies of the invention;

Figure 2 is an enlarged fragmentary longitudinal section of the cylinder and piston assembly illustrating the sealing means of the piston;

Figure 3 is an enlarged fragmentary longitudinal section of a portion of the swing joint illustrating a sealing means;

Figure 4 is an enlarged fragmentary longitudinal section of a cylinder and piston assembly illustrating still another form of the sealing means; and Figure 5 is a reduced side elevation of the sealing ring shown in Figure 4.

The sealing or packing means of the invention is adapted for use in many different classes and forms of mechanisms where it is required to maintain fluid tight seals between the members. The sealing means is capable of modification to adapt it for specific installations, and of course may be varied greatly in proportions. In the drawings I have illustrated typical forms of the invention embodied in or associated with conventional apparatus, it being understood that the invention is not to be construed as limited or restricted to the specific forms or applications herein disclosed, but is to be taken as including any features and modifications that may fall within the scope of the appended claims.

The present invention is not primarily concerned with the details of the particular mechanisms illustrated except insofar as they may occur in combination with the elements of the sealing means. In Figure 1 I have illustrated a cylinder 10 and a piston 11 operable in the cylinder. The reciprocable piston rod 12 passes through an opening 13 in a head 14 of the cylinder 10. The cylinder and piston device of Figure 1 is double acting and provision is made for introducing fluid under pressure to the opposite end portions of the cylinder 10. A ported boss 15 is provided at one end of the cylinder 10 for the reception of a pressure line and a ported boss or stud 16 is formed on the opposite end part of the cylinder to carry a hydraulic swing joint or swivel joint J. The port 17 of the stud 16 communicates with the interior of the swing joint sleeve 18, which in turn is ported and prepared for connection with a tube or fluid pressure line. The sleeve 18 of the joint J is rotatable on the stud 16 and has an annular internal space or groove 19 communicating with a series of radial ports 20 in the wall of the tubular boss 17. Typical sealing means of the invention are shown on the piston 11, in the rod-passing opening 13 and in the swing joint J, these being merely suitable applications of the improved sealing units.

Referring now to the sealing means of the piston 11, it will be observed that the piston is formed or provided with an annular peripheral groove 21. In the particular piston construction illustrated, the groove 21 is provided by reducing the external diameter of one end portion of the piston body and then securing a cap or head 22 on the reduced portion in a position where its end is spaced from a shoulder on the piston body. A nut 23 on the piston rod 12 secures the head 22 to the piston 11 and secures the piston assembly on the rod 12. The groove 21 has a cylindrical inner or bottom wall 24 which is concentric with the common longitudinal axis of the cylinder 10 and piston 11. The end walls 25 of the groove 21 are flat and while they may be normal to longitudinal axis of the piston it is preferred to make them outwardly divergent as best illustrated in Figure 2. I have found it desirable to slope or pitch the end walls 25 at an angle of about 10° with respect to the radial. The corners or edges 26 occurring where the end walls 25 join the periphery of the piston 11 are preferably beveled or rounded off. The groove 21 just described is provided to receive or contain the sealing ring 27 and its backing rings 28.

The sealing ring 27 is a simple uninterrupted annular member of flexible resilient material. The ring 27 may be formed of rubber, although in most installations it is preferred to form the ring of a synthetic rubber-like material that is unaffected by the fluid being handled and that retains its characteristics of flexibility and resiliency within a wide range of temperatures. In the preferred construction illustrated, the sealing ring 27 is initially cylindrical in transverse cross section, it having been found that a ring of this shape is effective in maintaining a fluid tight seal, is long lived, and offers a minimum of resistance to relative movement between the cylinder 10 and piston 11. The parts are related and proportioned so that the sealing ring 27 is under some radial compression at all times irrespective of the action of the fluid pressure. The depth or radial dimension of the groove 21 is slightly less than the cross sectional diameter of the ring 27 to produce this normal radial compression of the ring. The axial length of the groove 21 is considerably greater than the cross sectional diameter of the ring 27 to give the ring the desired freedom of action and to readily receive the backing rings 28.

The backing rings 28 are important elements of the sealing assembly. These rings are operable to prevent extrusion of the sealing ring 27 between the opposing or telescoping surfaces of the cylinder 10 and piston 11, and thus prevent premature wear and deformation of the sealing ring. As distinguished from the backing rings heretofore employed, the backing rings 28 of this invention do not cut, abrade or chew the sealing ring 27 and do not offer excessive resistance to relative movement between the members with which the sealing means is associated. There is a backing ring 28 arranged in the groove 21 at each side of the sealing ring 27. In practice, the two backing rings 28 may be identical. The rings 28 are simple annular members of rectangular cross sectional configuration and are arranged to have their inner and outer peripheral surfaces contact the bottom groove wall 24 and the cylinder wall respectively. With the parts in their idle and inactive positions, the backing rings 28 lie in parallel planes at opposite sides of the sealing ring as shown in Figures 1 and 2.

In accordance with the invention the backing rings 28 are formed of a flexible, yielding or pliant material to be readily conformable to the end walls 25 of the groove 21 and the cylinder wall when the assembly is subjected to fluid pressure. It is preferred to construct the backing rings 28 of a material that is flexible and yielding to the desired degree and yet is strong and not subject to failure or separation. I have found it practical to form the rings 28 of leather of the general character employed in cup leathers, etc. The leather rings 28 provide a minimum of friction and resistance to piston movement and cannot scrape or score the walls of the cylinder 10. The backing rings 28 are preferable continuous or unsplit, but where the conditions of assembly or operation require, the rings may be provided with radial or angular splits to render them freely expansible. While I have described the rings 28 as preferably formed of leather, it is to be understood that they may be formed of other strong flexible material.

When the piston packing assembly of Figures 1 and 2 is under pressure, as when the piston 11 is operated, the fluid pressure acts on the sealing ring 27 to crowd or force it against a backing ring 28. The pressure forces the backing ring 28 against the adjacent end wall 25 and subjects it to axial compression. This axial compression of the backing ring 28 produces or is accompanied by radial expansion of the ring and the periphery of the ring is brought into effective engagement with the wall of the cylinder 10. The pitch or slope of the wall 25 assists in bringing the backing ring 28 into tight effective engagement with the cylinder surface. The backing ring 28 thus compressed against the end groove wall 25 and forced against the cylinder wall effectively closes the essential tolerance space between the periphery of the piston 11 and the cylinder wall to prevent the extrusion of the sealing ring 27 into this tolerance or space. The effectiveness of the backing ring 28 in its function of preventing extrusion of the sealing ring 27 is substantially proportional to the fluid pressure imposed on the packing assembly, increasing with an increase in the fluid pressure. The sealing ring 27 is expanded or distorted radially upon being compressed axially against the backing ring 28 by the fluid pressure, and the outward force component resulting from the angularity of the end wall 25 assists in the radial expansion of the ring. Thus the fluid pressure actuates the sealing ring 27 to positively prevent leakage past the piston 11. When the pressure is relieved, the sealing ring 27 and the backing ring 28 tend to return to their normal positions and configurations. The backing ring 28 expands and contracts with each sequence of operations, but this "working" or breathing of the backing ring is not accompanied by cutting or abrading of the sealing ring 27. The relatively soft and pliant backing ring 28, while it is effective in preventing the extrusion of the sealing ring, is incapable of cutting, scoring or otherwise injuring the sealing ring. It will be apparent that upon piston operation in the opposite direction, the other backing ring 28 comes into play to prevent extrusion of the sealing ring 27 and the sealing ring again operates as above described to prevent the leakage of fluid pressure.

In high pressure, and relatively high pressure installations, the fluid pressure acting on the sealing ring 27 crowds it against the backing ring 28 with such force that the cylindrical surface of the sealing ring distorts the pliant backing ring and causes radial flow or expansion of the backing ring, both inwardly and outwardly with respect to the longitudinal axis of the piston and cylinder assembly. The sustained or repeated distorting or forming of the backing ring by the cylindrical sealing ring, soon produces a permanent groove in the side face of the backing ring. This groove partially receives and is substantially complementary to the cylindrically curved convex surface of the sealing ring 27. Owing to the fact that the sealing ring is partially received in the groove pressed into the backing ring 27, the volume of the annular space originally defined by the surface of the cylinder 10, the exposed surface of the backing ring 28 and the surface of the ring 27 is materially reduced. The permanent forming or grooving of the backing ring 28 by the sealing ring 27 pressing against it, establishes the fact that the axial pressure exerted on the backing ring by the sealing ring operates to compress the backing ring axially and expand it radially, the radial expansion being both inward and outward relative to the longitudinal axis of the piston 11. The inward radial expansion causes the internal surface of the backing ring 28 to forcibly engage the inner wall 24 of the groove 21 and to forcibly engage the surface of the cylinder 10 whereby extrusion of the sealing ring is prevented at both the internal and external surfaces of the backing ring. The inward and outward radial expansion of the backing ring occurs during and subsequent to the permanent conformation or grooving of the backing ring as described above, and protects the sealing ring against wear, breakage, and cutting, as a result of extrusion at either the internal or peripheral surface of the backing ring.

Figure 4 illustrates a sealing means of the invention associated with a piston 11' of a single action cylinder and piston mechanism. In this case the annular external groove 21' of the piston has one pitched end wall 25' and its opposite end wall 30 may be normal to the longitudinal axis of the assembly. The sealing ring 27 may be the same as the ring illustrated in Figures 1 and 2 and a backing ring 28' of leather, or the like, is arranged in groove 21' between the sealing ring 27 and the sloping end wall 25'. The backing ring 28' is provided with a split 29, see Figure 5, whereby it may be expanded or opened up for ready insertion in the groove of an integral piston 11'. Where the ring 28' is split it is preferred to reinforce it. I have shown a metal ring 50 within the leather ring 28' to serve as a reinforcement. The ring 50 may be of any selected cross section and is split in the same manner as the ring 28'. The reinforced ring 28' may be employed in the other embodiments of the invention to facilitate the assembling of the sealing means. The bottom or inner wall 24' of the groove 21' may be cylindrical and is concentric with the longitudinal axis of the cylinder and piston assembly. The groove 21' is of sufficient length to readily accommodate the sealing ring 27 and the backing ring 28, but the sealing ring 27 may be under some radial compression when the mechanism is in the idle condition.

The operation of the sealing means of Figure 4 is the same as described above except that the sealing ring 27 and the backing ring 28' are only subjected to substantial fluid pressures upon operation of the piston 11' in one direction. The backing ring 28', when subjected to axial compression is expanded radially to have effective pressure engagement with the wall of the cylinder 10 and thus prevent extrusion of the sealing ring 27 between the surfaces of the cylinder and piston. The sealing ring 27 is acted upon by the fluid pressure to seal with the cylinder wall and dependably prevent the leakage of fluid. When pressure is removed from the assembly the sealing ring 27 and the backing ring 28' return to their normal positions and configurations.

The invention is well suited for embodiment in an assembly for sealing about a reciprocating member. In Figure 1 I have shown a sealing means at the opening 13 for sealing about the piston rod 12. An annular groove 35 is provided in the wall of the opening 13 to contain the sealing assembly. The bottom or outer wall of the groove 35 is cylindrical and concentric with the opening 13, while the end walls of the groove are preferably pitched to be in outwardly convergent relation. The sealing assembly is similar to the piston sealing assembly, comprising a sealing ring 36 of cylindrical cross section formed of rubber or rubber-like synthetic material, and backing rings 37 of leather or other flexible material arranged between the sealing ring and the end walls of the groove 35. The sealing ring 36 is preferably proportioned so that it is under some radial compression when idle or not subjected to fluid pressure. The action or operation of the sealing assembly is the same as that of the piston packing assembly except that the sealing ring 36 seals inwardly against the rod 12 and the backing rings 37 to prevent extrusion of the sealing material between the surface of the rod and the wall of the opening 13. It will be observed that the sealing means for preventing the leakage of fluid pressure about the piston rod 12 is simple and compact and may be readily embodied in the mechanism.

The invention is also adapted for embodiment in sealing assemblies for preventing the leakage of fluid between relatively rotating parts. The joint J illustrated in Figures 1 and 3 employs such sealing means of the invention. In this case the sealing means are carried by the outer part or sleeve 18, it being understood that in other instances of relatively rotatable elements the sealing means may be carried by the inner element. The sleeve 18 is provided with annular internal grooves spaced at opposite sides of its fluid chamber 19. The outer or bottom walls 40 of the grooves are cylindrical and concentric with respect to the sleeve and stud 16. The inner end walls of the grooves may be normal to the longitudinal axis of the joint J. The outer end walls 41 of the grooves are pitched at about 10° to diametric planes.

Each sealing assembly of the joint J includes a sealing ring 42 and a backing ring 43. The sealing rings 42 are preferably formed of rubber or synthetic rubber and are cylindrical in cross section. The cross sectional diameter of the rings 42 is greater than the radial depth of the grooves so that the rings are radially compressed to some extent even when not subjected to the action of fluid pressure. The backing rings 43 are arranged between the sealing rings 42 and the sloping end walls 41. The backing rings 43 are rectangular in transverse cross section and have their inner and outer edges or peripheries in engagement with the surface of the stud 16 and groove walls 40. The backing rings 43 are formed of leather or other strong wear resistant flexible material.

During operation of the mechanism, the sleeve 18 of the joint J may rotate on its stem or stud 16 and fluid under substantial pressure may be handled by the joint. The fluid pressure acting on the sealing rings 42 forces or compresses the sealing rings against the backing rings 43. This compresses the backing rings 43 against the sloping end walls 41 and the backing rings are expanded radially to have effective engagement with the surface of the stud 16. This engagement prevents extrusion of the sealing ring material between the surfaces of the stud 16 and sleeve 18. The sealing rings 42 are operable to maintain effective fluid tight seals even during periods of rotation of the swing joint with the fluid under substantial pressure. It will be observed that the flexible or pliant backing rings 43 have no tendency to cut or abrade the sealing rings 42.

It will be seen that I have provided sealing means having a wide range of application. The sealing assemblies are useful in such devices as the actuating cylinders and struts of aircraft landing gear, brake cylinders, pumps, hydraulic rotary couplings, the seals for poppet valve stems, etc. The sealing means has dependably withstood fluid pressures of 4500 pounds per square inch and has successfully operated for extended periods under 3000 pounds pressure per square inch without leakage and without appreciable wear of either the sealing ring or backing rings. As above described, the backing rings are effective in preventing extrusion of the sealing ring but do not cut or abrade the sealing ring as do the metal non-extrusion rings of prior assemblies of this class.

The backing ring is described in certain of the claims as being "substantially in contact" with the bottom wall of the groove and the overlying, spaced-apart wall of the cooperating member. By "substantially in contact" is meant such a close relation of the inner and outer peripheral edges of the backing ring with respect to the spaced-apart walls referred to that when the sealing ring compresses the backing ring in the manner described, the resultant radial inward and outward expansion of the backing ring will be adequate to insure a firm contact between the inner and outer peripheral edges of the backing ring and the spaced-apart walls and thereby prevent extrusion of the sealing ring under such edges.

Having described only typical forms of the invention, I do not wish to be limited to the specific details herein set forth, but wish to reserve to myself any variations or modifications that may appear to those skilled in the art or fall within the scope of the following claims.

I claim:

1. Means for sealing between two members arranged one within the other, there being an annular space between the members defined by an end wall and a bottom wall as portions of one of said members, said means comprising a sealing ring of flexible resilient material engaged in said space to seal with said members, and an axially-compressible, radially-expansible, yieldable backing ring of pliant material arranged in said space between the sealing ring and said end wall, said backing ring being substantially in contact with the bottom wall of said annular space and the adjacent wall of the other of said members and being adapted to be compressed axially by the sealing ring, when the same is forced axially against it by fluid pressure, and thereby to be expanded radially inwardly and outwardly to contact both of said members to prevent the extrusion of the material of the sealing ring between the surfaces of the members beyond said end wall.

2. In combination, two relatively movable members arranged one within the other to have adjacent concentric surfaces, there being an annular groove in one of said surfaces presenting at least one end wall, and means for sealing between the members comprising a flexible resilient sealing ring of substantially circular cross section arranged in the groove to seal between the members, and an axially-compressible, radially-expansible, leather ring in the groove between the sealing ring and said wall, said leather ring being substantially in contact with the bottom wall of said groove and the other of said surfaces and being adapted to be compressed axially by the sealing ring and thereby to be expanded radially against the other of said surfaces and against the bottom wall of said groove to prevent the extrusion of the sealing ring between said surfaces and to prevent extrusion of the sealing ring between said bottom wall and the leather ring.

3. Means for preventing the leakage of fluid pressure from between two relatively movable members arranged one within the other and having concentric surfaces with only working clearance between them, there being an annular groove in one of said surfaces having a substantially cylindrical bottom wall and at least one flaring end wall, the sealing means including a flexible resilient sealing ring of substantially circular cross section arranged in the groove to be under compression between said bottom wall and the other of said surfaces, and an axially yieldable pliant backing ring between the sealing ring and said flaring wall having its inner and outer peripheries in contact with said bottom wall and said other surfaces and compressed axially by the sealing ring to expand radially against said other surface and said bottom wall to prevent extrusion of the sealing ring between said surfaces when the sealing ring is compressed against the backing ring by the fluid pressure.

4. Means for preventing the leakage of fluid pressure from between two relatively movable members arranged one within the other and having concentric surfaces with only working clearance between them, there being an annular groove in one of said surfaces having a substantially cylindrical bottom wall and flaring end walls, the sealing means including a flexible resilient sealing ring of circular cross section arranged in the groove under compression between said bottom wall and the other of said surfaces to seal between the members and means for preventing extrusion of the sealing ring between said surfaces when forced toward the end walls by the fluid pressure, the last named means including axially yieldable pliant rings arranged in the groove between the sealing ring and said end walls to be compressed axially by the sealing ring forced against it by the fluid pressure and thus expanded radially against said other surface and said bottom wall.

5. Means for preventing the leakage of fluid pressure from between two relatively movable members arranged one within the other and having concentric surfaces with only working clearance between them, there being an annular groove in one of said surfaces having a substantially cylindrical bottom wall and flaring end walls, the sealing means including a flexible resilient sealing ring of circular cross section arranged in the groove under compression between said bottom wall and the other of said surfaces to seal between the members, and means for preventing extrusion of the sealing ring between said surfaces when forced toward the end walls by the fluid pressure, the last named means including axially yieldable leather rings of rectangular cross section arranged in the groove between the sealing ring and said end walls to be compressed axially by the sealing ring forced against them by the fluid pressure, the axial compression expanding the leather rings radially against said bottom wall and said other surface.

6. Sealing means for sealing between two interfitting members, one having an annular groove, the other having a surface overlying the mouth of the groove, said sealing means including a flexible resilient sealing ring of substantially circular transverse cross section arranged in the groove and proportioned to be under radial compression between said surface and the bottom wall of the groove, and means for preventing extrusion of the material of the sealing ring from the groove comprising an axially-compressible, radially-expansible, yieldable backing ring of pliable compressible material arranged in the groove between a side wall thereof and the sealing ring, said backing ring being substantially in contact with the bottom wall of said groove and said surface and being adapted to be deformed and compressed axially, when the curved surface of the sealing ring is forced axially against it by the fluid pressure, and thereby to be expanded radially inward and radially outward and have its inner and outer surfaces tightly engage the first mentioned surface and said bottom wall before the curved surface of the sealing ring which thus acts on the backing ring is deformed to such a degree as to reach said inner and outer surfaces of the backing ring.

7. Sealing means for use with two members which extend one within the other and which have adjacent concentric surfaces, an annular groove formed in one of said surfaces, said groove having an annular end wall and an annular bottom wall, said sealing means including a sealing ring of flexible resilient material arranged in said groove, said ring being substantially circular in cross section, and an axially-compressible, radially-expansible, yieldable backing ring of pliant material arranged in said groove between said sealing ring and said end wall, said backing ring being substantially in contact with the bottom wall of said groove and with the other of said surfaces and being adapted to be compressed axially by said sealing ring when the latter is urged in an axial direction against the backing ring by fluid pressure and being thereby expanded radially against the other of said surfaces to prevent extrusion of the material of the sealing ring between said surfaces beyond said end wall.

ROBERT O. HALLEN.

REFERENCES CITED

The following references are of record in the file of this patent:

UNITED STATES PATENTS

| Number | Name | Date |
| --- | --- | --- |
| 1,338,871 | Schneider | May 4, 1920 |
| 2,106,293 | Christenson | Jan. 25, 1938 |
| 2,115,383 | Christensen | Apr. 26, 1938 |
| 2,232,293 | Toennies | Feb. 18, 1941 |
| 2,349,170 | Jackman | May 16, 1944 |
| 2,360,735 | Smith | Oct. 17, 1944 |

FOREIGN PATENTS

| Number | Country | Date |
| --- | --- | --- |
| 21,717 | Great Britain | 1892 |